United States Patent
Satpathy et al.

(10) Patent No.: US 10,103,877 B2
(45) Date of Patent: Oct. 16, 2018

(54) SMS4 ACCELERATION PROCESSORS HAVING ROUND CONSTANT GENERATION

(71) Applicant: Intel Corporation, Santa Clara, CA (US)

(72) Inventors: Sudhir K. Satpathy, Hillsboro, OR (US); Sanu K. Mathew, Hillsboro, OR (US); Kirk S. Yap, Westborough, MA (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 14/864,227

(22) Filed: Sep. 24, 2015

(65) Prior Publication Data

US 2017/0093562 A1    Mar. 30, 2017

(51) Int. Cl.
*G06F 9/30* (2018.01)
*G06F 21/60* (2013.01)
*H04L 9/28* (2006.01)
*H04L 9/06* (2006.01)
*H04L 9/14* (2006.01)

(52) U.S. Cl.
CPC .............. *H04L 9/0675* (2013.01); *H04L 9/14* (2013.01); *H04L 2209/34* (2013.01)

(58) Field of Classification Search
CPC ................................ H04L 9/14; H04L 9/28
USPC ........................................................ 380/28
See application file for complete search history.

(56) References Cited

U.S. PATENT DOCUMENTS

| 6,314,187 | B1 * | 11/2001 | Menkhoff | H04L 9/0668 380/28 |
| 8,538,015 | B2 * | 9/2013 | Gueron | G06F 12/0875 380/28 |
| 2003/0059054 | A1 * | 3/2003 | Hu | H04L 9/0631 380/277 |
| 2008/0019504 | A1 * | 1/2008 | Han | H04L 9/0631 380/28 |
| 2008/0240426 | A1 * | 10/2008 | Gueron | G06F 12/0875 380/44 |
| 2009/0157779 | A1 | 6/2009 | Gouget et al. | |
| 2010/0011047 | A1 * | 1/2010 | Jackson | G06F 7/722 708/491 |
| 2010/0111296 | A1 * | 5/2010 | Brown | H04L 9/0643 380/28 |
| 2011/0158403 | A1 | 6/2011 | Mathew et al. | |
| 2015/0186138 | A1 | 7/2015 | Wolrich et al. | |
| 2015/0244518 | A1 | 8/2015 | Koo et al. | |

OTHER PUBLICATIONS

PCT Notification of Transmittal of the International Search Report and the Written Opinion of the International Searching Authority for PCT Application No. PCT/US2016/047054, dated Aug. 15, 2017, 19 pages.

\* cited by examiner

*Primary Examiner* — Morshed Mehedi
*Assistant Examiner* — Dereena T Cattungal
(74) *Attorney, Agent, or Firm* — Lowenstein Sandler LLP

(57) ABSTRACT

A processing system includes a memory and a processing logic operatively coupled to the memory. The processing logic identifies one or more constant bits of an output bit sequence. The processing logic generates a plurality of variable bits of the output bit sequence. The processing logic produces the output bit sequence including the identified constant bits and the generated plurality of variable bits.

18 Claims, 15 Drawing Sheets

SMS4 ACCELERATION PROCESSORS HAVING ROUND CONSTANT GENERATION

TECHNICAL FIELD

The embodiments of the disclosure relate generally to a computing device, and, more specifically, relate to SMS4 acceleration processors having round constant generation for providing area optimal configuration in processors while allowing for on-the-fly key expansion for key generation.

BACKGROUND

Cryptology is a technology often used to protect confidential or secret information in computer systems and other electronic devices. Cryptology generally involves using a cryptographic algorithm and a cryptographic key to protect the information. For example, encryption (sometimes referred to as cipher) may be performed in which a series of transformations or operations as specified by the cryptographic algorithm are performed on unencrypted or plaintext input data (e.g., a string of bits representing text, numbers, intelligible characters, etc.) using an encryption key (e.g., a string of bits) to produce encrypted data. The encrypted data is also sometimes referred to as cipher text or cipher data. The encrypted data is generally unintelligible. It is generally not possible, or at least not practically feasible, to determine the unencrypted plaintext data from the encrypted data, without knowing the cryptographic key. If the cryptographic key is known, decryption (sometimes referred to as inverse cipher) may be performed on the encrypted data to reproduce the corresponding plaintext or unencrypted data. The transformations or operations performed during decryption may be substantially the reverse of those performed during encryption.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

SMS4 is a block cipher cryptographic algorithm that is employed for data encryption/decryption in wireless networks. SMS4 data encryption operation may comprise a plurality of encryption rounds. Each round involves a number of different data manipulation operations that are performed in order to transform the input data (plaintext) into the encrypted data (cipher text). Data decryption operation may comprise a plurality of decryption rounds involving a number of similar data manipulation operations.

Conventional SMS4 accelerators map round constants into look up tables (LUTs), which takes up a lot of area on the hardware and incur additional key-generation latency. A round constant is derived from a 32 bit accumulator by incrementing or decrementing a fixed constant.

Aspects of the present disclosure eliminate the need for the LUTs, which greatly reduces area on the hardware. Aspects of the present disclosure allow for fast and efficient on-the-fly key-expansion without incurring any additional key-generation latency, thus reducing overall latency overhead. In one embodiment, the SMS4 accelerator includes a round constant generation logic, which identifies constant bits in an output bit sequence and exploits repetitive patterns on variable bits of the output bits sequence, enabling efficient generation of the bits. In an illustrative example, the constant bits are two least significant bits and the variable bits are next two least significant bits.

Figure 1:
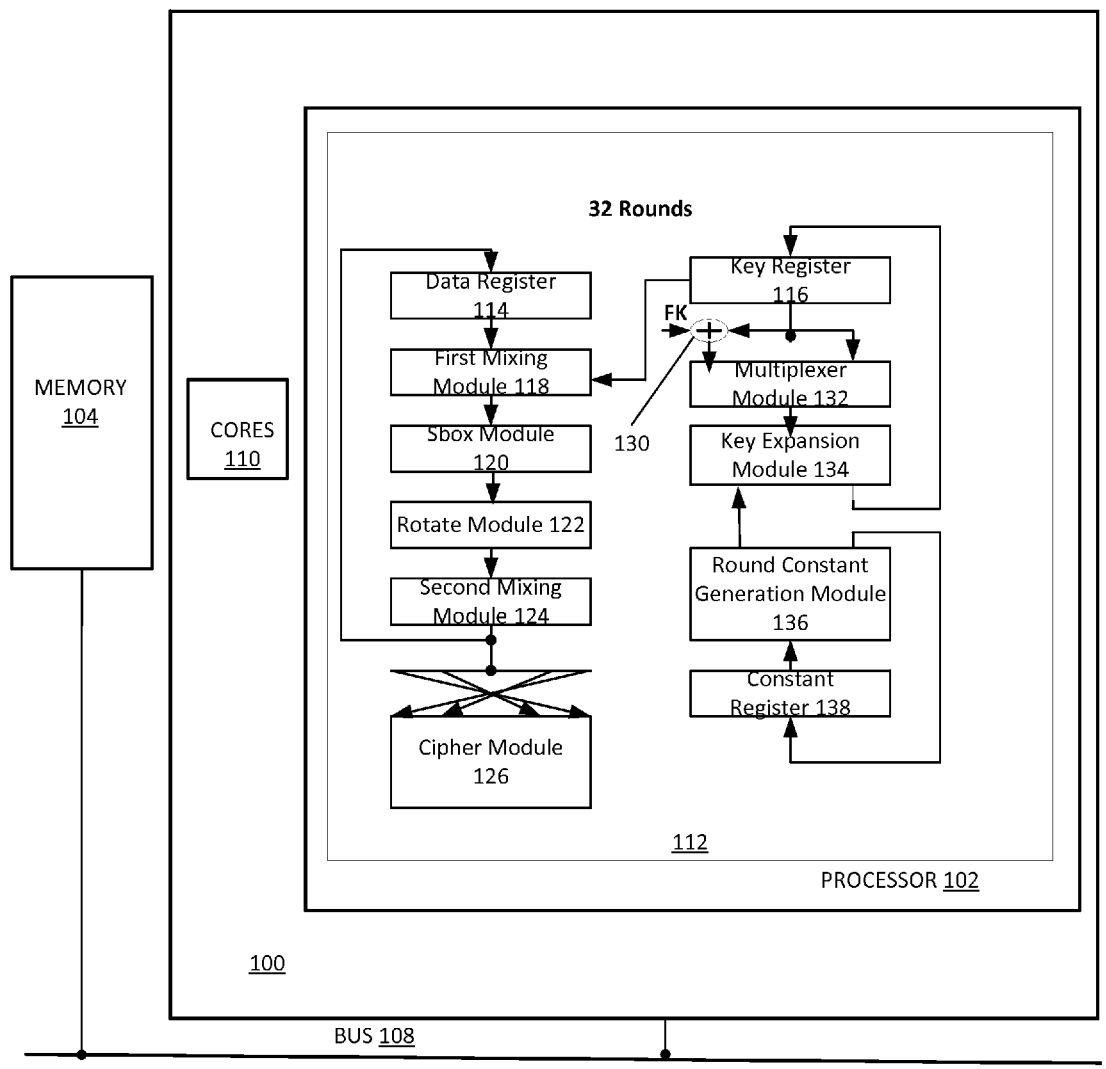
FIG. 1 illustrates a system-on-a-chip (SoC) including a processing system to perform cryptography according an embodiment of the present disclosure.

FIG. 1 illustrates a system-on-a-chip (SoC) 100 including a processing system according to an embodiment of the present disclosure. The SoC 100 may include a processor (such as a central processing unit (CPU)) 102 and a memory that are connected to each other via a bus system 108. The processor 102 may execute tasks such as system applications and user applications using the memory 104 to store the instructions of the programs and data associated with the programs.

In one embodiment, the processor 102 may also include one or more processing cores 110 and a SMS4 hardware accelerator 112 communicatively coupled to the processing core 110. The SMS4 hardware accelerator 112 functions to generate round constants for both encryption and decryption modes of operations.

The SMS4 hardware accelerator 112 includes a data register 114 for storing input bit data including a plurality of data bits. In one embodiment, the plurality of data bits includes a 128 bit data. In one embodiment, the SMS4 hardware accelerator 112 processes the plurality of data bits in an encryption mode. In one embodiment, the SMS4 hardware accelerator 112 processes the plurality of data bits in a decryption mode. The SMS4 hardware accelerator 112 also includes a key register 116 for storing the input key data including a plurality of key bits. In one embodiment, the plurality of key bits includes a 128 bit key. Both the data bits and the key bits are sent to a first mixing module 118 to perform byte mixing operation with both the data bits and the key bits resulting in a first mixed data. In one embodiment, a higher order of 32 bit from the key are mixed with the 32 bit data resulting in a 32 bit word.

The first mixed data (i.e. 32 bit word) is processed by a substitution-box (Sbox) module 120 to perform a byte substituting operation with the mixed data resulting in a substitute data (i.e. 32 bit Sbox output). The substitute data outputted from the data Sbox module 120 is further rotated by a rotate module 122 to perform a rotation operation to output a rotated data. In one embodiment, the data rotation operation is accomplished by swizzling the wires that carry Sbox outputs to a second (final) mixing module as described further herein below. In one embodiment, the data is shifted by a certain number of bits.

The SMS hardware accelerator 112 also includes a second mixing module 124, which mixes the rotated data to output a second mixed data. The second mixed data combines the primary Sbox output, the rotated Sbox outputs with a unique word from the data to generate a new word that replaces an existing word from the data. The second mixed data is then sent as an input to a cipher module 126. Following the second mixing operation in the second mixing module 124, the 32b output from the second mixing module 124 is used to replace one of the one of the 32b words in the data register 114. The remaining three 32b words are obtained by shifting the data register 114 left or right in encryption or decryption. Following 32 rounds of operation, the 128b data is shuffled using the cipher module 126 to generate the encrypted or decrypted output.

In one embodiment, a constant value FK, is a 128b constant that is used only in the first round iteration. In the first round iteration of key expansion, the FK is added with a 128b user provided key by an add operation 130 to generate a first key, which is stored in a Key register 116. In a second round iteration, the first key is sent to a multiplexer 132, output of which is sent to a Key expansion module 134 to generate the next key, which is sent to the Key register 116. Accordingly, the key expansion module 134 operates on the user-provided key for the first round and derives a new key for use in the next round. For 32 rounds of key expansion, the key expansion module 134 needs 32 round constants, called CKs, which are generated by round constant generation module 136 and stored in a constant register 138. Therefore, the concurrent key derivation for the next round in parallel to current round computation hides key-expansion latency. The 32b round constant, CK generated by the round constant generation module 136 is stored in a constant register module 138. Each iteration uses a new key that is derived from the previous key using a similar set of operations. Following the 32$^{nd}$ round, the final selected key bits includes 32b key words of the encrypted or decrypted key. In one embodiment, the round constant generation module 136 utilizes an 8 bit accumulator to compute the 32b round constant CK as described in greater detail below with respect to FIG. 2. In another embodiment, the round constant generation module 136 utilizes a 2 bit counter to compute the 32b round constant CK as described in greater detail below with respect to FIG. 3.

Figure 2:
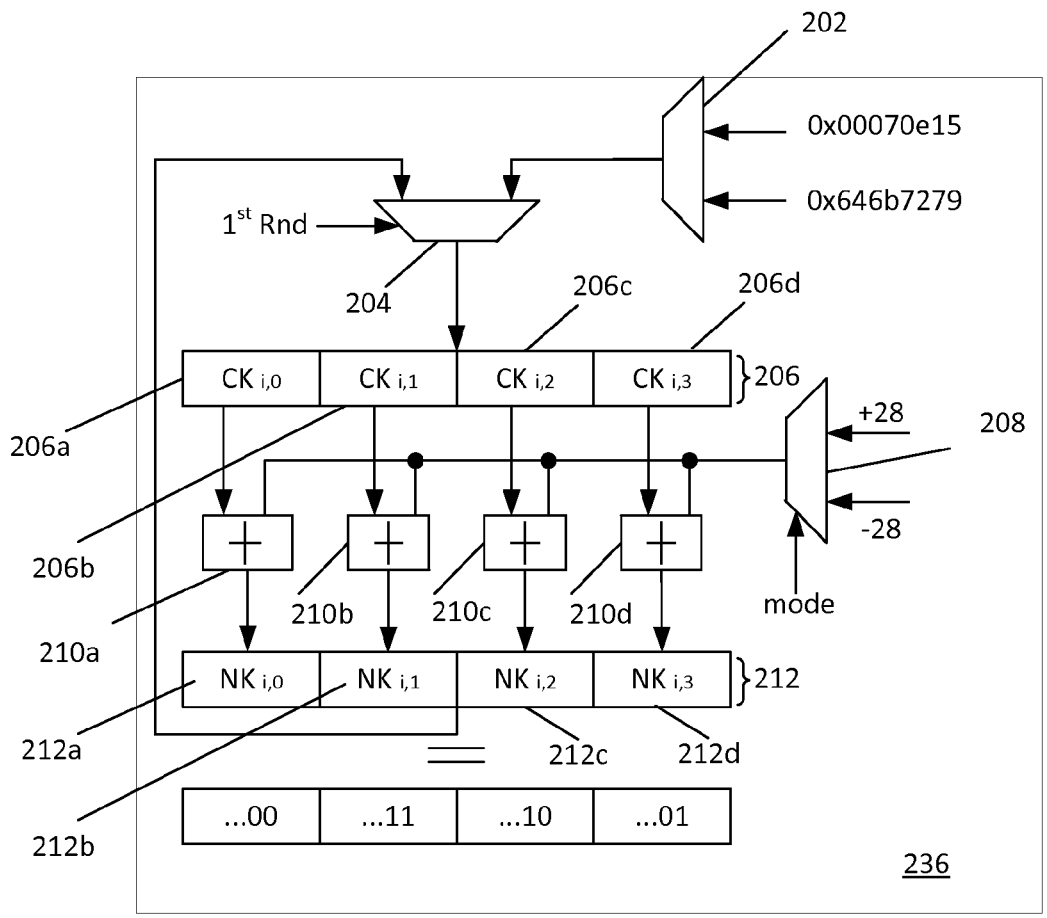
FIG. 2 illustrates an example of a logic diagram of a round constant generation in the processing system of FIG. 1 according to an embodiment of the present disclosure.

FIG. 2 illustrates a logic diagram 200 of a round constant generation module 236 in accordance with one embodiment of the present disclosure. The round constant generation module 236 is same as the round constant generation module 136 of FIG. 1 utilizing a 8 bit accumulator. The round constant generation module 236 functions to generate a 32b round constant, CK for the key-expansion in encrypt and decrypt modes. In one embodiment, the constants for all 32 rounds in an encryption mode of operation are shown in Table 1 below:

TABLE 1

| 00070e15, | 1c232a31, | 383f464d, | 545b6269, |
| 70777e85, | 8c939aa1, | a8afb6bd, | c4cbd2d9, |
| e0e7eef5, | fc030a11, | 181f262d, | 343b4249, |
| 50575e65, | 6c737a81, | 888f969d, | a4abb2b9, |
| c0c7ced5, | dce3eaf1, | f8ff060d, | 141b2229, |
| 30373e45, | 4c535a61, | 686f767d, | 848b9299, |
| a0a7aeb5, | bcc3cad1, | d8dfe6ed, | f4fb0209, |
| 10171e25, | 2c333a41, | 484f565d, | 646b7279 |

In one embodiment, the CKs listed above are accessed in reverse order during decryption mode of operation. As discussed above, each SMS4 round requires a new 128b key that is derived from the previous key using a 32b round constant CK.

The logic diagram 200 includes a first multiplexer 202 having an input indicating that the operation is either an encryption mode or a decryption mode. Since, the first CK value is 00070e15, the input of the first multiplexer 202 indicates an encryption mode. The output of the first multiplexer 202 indicating encryption mode of operation is an input of a second multiplexer 204. Another input of the second multiplexer 204 is the first CK value 00070e15 provided in the first round is now being used through a second round into a 32 bits register 206. The 32 bits register 206 is divided into four of 8 bits registers 206a, 206b, 206c and 206d, each of which includes constant values CKi0, CKi1, CKi2 and CKi3 respectively. The constant values CKi0, CKi1, CKi2 and CKi3 from the first round are 00 07 0e and 15 respectively.

In one embodiment, the 32 bits register 206 is incremented by 28 (+28) for every cycle in an encryption mode. As such, the +28 is an input into a third multiplexer 208. The output of the third multiplexer +28 indicating increment by 28 and each of these constant values CKi0, CKi1, CKi2 and CKi3 are sent into add operations 210a, 210b, 210c and 210d respectively. The output of the add operations 210a, 210b, 210c and 210d generate next constant (NK) values, NKi0, NKi1, NKi2 and NKi3 respectively for the second round, which are stored in their respective 32 bits register 212. The 32 bits register 212 is divided into four of 8 bits registers 212a, 212b, 212c and 212d, each of which includes constant values NKi0, NKi1, NKi2 and NKi3 respectively. For the second round, the NKi0, NKi1, NKi2 and NKi3 values are 1c 23 2a and 31 respectively. These NK values from the second round is input into the second multiplexer 204 and loaded back into the 32 bits register 206, which is divided into 8 bits registers 206a, 206b, 206c and 206d as the constant values CKi0, CKi1, CKi2 and CKi3 respectively. Accordingly, the CKi0, CKi1, CKi2 and CKi3 in the second round are 1c 23 2a and 31 respectively.

As such, the process is repeated using the NKi0, NKi1, NKi2 and NKi3 values 1c 23 2a and 31 respectively from the second round to be loaded into CKi0, CKi1, CKi2 and CKi3 respectively for the third round. In the third round, the NKi0, NKi1, NKi2 and NKi3 values generated are 38 3f 46 and 4d respectively. The process is repeated using NKi0, NKi1, NKi2 and NKi3 values 38 3f 46 and 4d respectively from the third round to be loaded into CKi0, CKi1, CKi2 and CKi3 respectively for the fourth round. In the fourth round, the NKi0, NKi1, NKi2 and NKi3 values generated are 54 5b 62 and 69 respectively. The process is repeated until the $32^{nd}$ round in which the NKi0, NKi1, NKi2 and NKi3 values generated are 64 6b 72 and 79 respectively.

Accordingly, in the table as shown above, a first last two digits of the NKi3 is always going to be 5 1 d and 9, the first last two digits of the NKi2 is always going to be e a 6 and 2, the first last two digits of the NKi1 is always going to be 7 3 f and b and the first last two digits of the NKi0 is always going to be 0 c 8 and 4. The binary value of the 5 1 d and 9 of NKi3 is 01, so first last two bits of NKi3 is 01, the binary value of e a 6 and 2 of the NKi2 is 10, so the first last two bits of Nki2 is 10, the binary value of 7 3 f and b for NKi2 is 11, so the first last two bits of Nki1 is 11 and the binary value of 0 c 8 and 4 of NKi0 is 00, so the first last two bits of Nki0 is 00.

Hence, a first last two bits of all 4 bytes i.e. NKi0, NKi1, NKi2 and NKi3 do not change values and remain constant at 00, 11, 10 and 01 respectively. In one embodiment, the first last two bits are two least significant bits in round constant bytes. As such, the 8-bit values in the 32 bits will repeat in every round, hence eliminating the need for an 8-bit accumulator to generate the CK values in the table above. In one embodiment, the constant bit values of 0 is connected to low voltage (for example, ground) in a chip and the constant bit values of 1 is connected to high voltage (for example, voltage supply) in the chip, which essentially are part of the accumulator. Hence, the eight registers corresponding to these constant bit values in the accumulator are eliminated to save area in the chip while still generating round constants with 100% accuracy.

Figure 3:
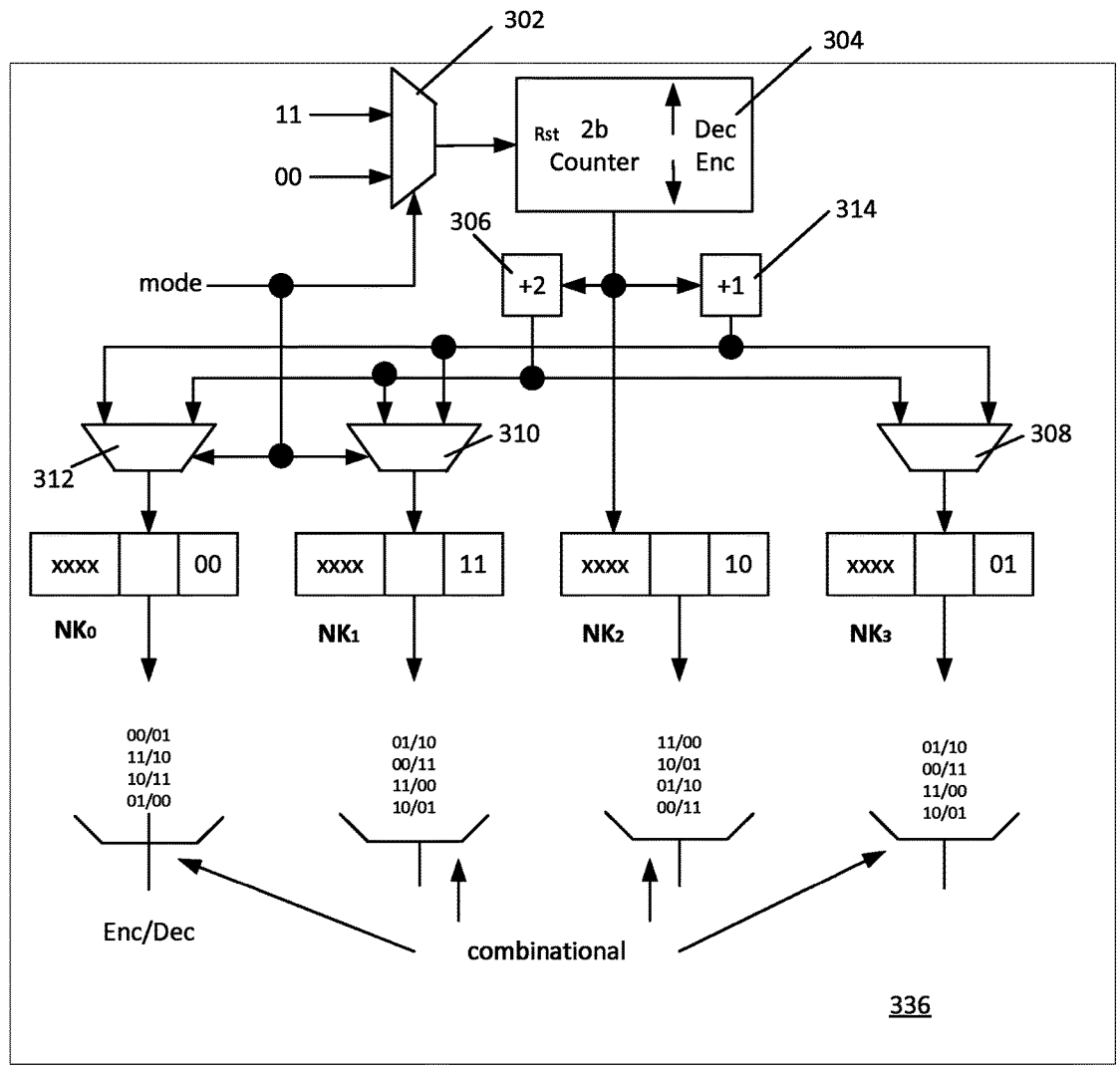
FIG. 3 illustrates an example of a logic diagram of a round constant generation in the processing system of FIG. 1 according to an embodiment of the present disclosure.

FIG. 3 illustrates a logic diagram 300 of a round constant generation module 336 in accordance with one embodiment of the present disclosure. The round constant generation module 236 is same as the round constant generation module 136 of FIG. 1 utilizing a 2 bit counter. The round constant generation module 336 functions to generate a 32b round constant, CK for the key-expansion in encrypt and decrypt modes.

In one embodiment, the constants for all 32 rounds in an encryption mode of operation are shown in table 1 above. In one embodiment, the CKs listed above are accessed in reverse order during decryption mode of operation. As discussed above, each SMS4 round requires a new 128b key that is derived from the previous key using a 32b round constant CK.

As discussed above, the first last two bits of the constant values 5 1 d 9 repeated in each column in the table 1 are always going to be constant bits 01. In one embodiment, the logic diagram 300 functions to generate second last two bits of the constant values 5 1 d 9 as NK3. Also, as discussed above, the first last two bits of the constant values e a 6 2 repeated in each column in the table 1 are always going to be constant bits 10 and the logic diagram 300 functions to generate second last two bits of the constant values e a 6 2 as Nk2. Also, as discussed above, the first last two bits of the constant values 7 3 f b repeated in each column in the table 1 are always going to be constant bits 10 and the logic diagram 300 functions to generate second last two bits of the constant values 7 3 f b as Nk1. Further, as discussed above, the first last two bits of the constant values 0 c 8 4 repeated in each column in the table 1 are always going to be constant bits 00 and the logic diagram 300 functions to generate second last two bits of the constant values 0 c 8 4 as Nk1. In one embodiment, the second last two bits are the next two least significant bits in the round constant bytes. Details of logic diagram 300 generating these second last two bits of the constant values is described herein below.

The logic diagram 300 includes a first multiplexer 302 having an input indicating that the operation is either an encryption mode or a decryption mode. In one embodiment, in the encryption mode, the input to the first multiplexer 302 begins with a binary value 11. In one embodiment, in the decryption mode, the input to the first multiplexer 302 begins with a binary value of 00. The output of the first multiplexer 302 is an input to a 2b counter 304 which increments (counts up) in a decryption mode and decrements (counts down) in an encryption mode.

As discussed above, in the encryption mode, the input to the first multiplexer 302 begins with the binary value 11. The output of the first multiplexer 302 is the input to a 2b counter 304. In the first cycle, the binary value of 11 outputted from the 2b counter 304 and is added to a +2 (binary value of 10) add operation 306. The output of the +2 add operation 306 is 1 having the binary value of 01, which is an input to a second multiplexer 308, which outputs the binary value of 01. This binary value of 01 is the second last two bits of the constant value 5.

In one embodiment, in the encryption mode, the 2b counter 304 is decremented (counts down) such that the binary value will decrease by 1 in every cycle. As such, in a second cycle, the 2b counter 304 is decremented (counts down) from 3 having the binary value of 11 to 2 having the binary value of 10. The binary value 10 outputted from the 2b counter 304 in the second cycle is added to the +2 (10) add operation 306. The output of the add operation 306 is 00 having the binary value of 00 is an input to a second multiplexer 308, which outputs the binary value of 00. This binary value of 00 is the second last two bits of the constant value 1. In a third cycle, the 2b counter 304 is decremented from 2 having the binary value of 10 to 1 having the binary value of 01. The binary value 01 outputted from the 2b counter 304 in the third cycle is added to the +2 (10) add operation 306. The output of the add operation 306 is 3 having the binary value of 11, which is an input to a second multiplexer 308, which outputs the binary value of 11. This binary value of 11 is the second last two bits of the constant value d. In a fourth cycle, the 2b counter 304 is decremented (counts down) from 1 having the binary value of 01 to 0 having the binary value of 00. The binary value 00 outputted from the 2b counter 304 in the fourth cycle is added to the +2 (10) add operation 306. The output of the add operation 306 is 2 having the binary value of 10, which is an input to a second multiplexer 308, which outputs the binary value of 10. This binary value of 10 is the second last two bits of the constant value 9. Accordingly, the second last two bits of NK3 are generated. As such, the second last two bits generated for NK3 in encryption mode follow a periodic pattern of 01 00 11 10 in every row of the table 1.

In one embodiment, the second last two bits generated for the NK1 is generated in encryption mode using same logic 300 as described above with respect to the second last two bits for NK3 as described above using a multiplexer 310 instead of a multiplexer 308. In one embodiment, the binary value of 01 is the second last two bits of the constant value 7, the binary value of 00 is the second last two bits of the constant value 3, the binary value of 11 is the second last two bits of the constant value f and the binary value of 10 is the second last two bits of the constant value b. As such, the second last two bits generated for NK1 in encryption mode follow the same periodic pattern as NK3 of 01 00 11 10 in every row of the table 1.

In one embodiment, the second last two bits for the Nk0 is generated in encryption mode using same logic 300 as described above with respect to the second last two bits generated for Nk3 as described above with respect to the second last two bits for NK3 as described above using a multiplexer 312 instead of the multiplexer 308. However, the second last two bits generated for Nk0 follow a different periodic pattern from NK3 and NK1. Since, the constant CKs are specified by the SMS4 standard, in this scenario, the NK0 follows a different pattern from NK3 and NK1. In one embodiment, the binary value of 00 is the second last two bits of the constant value 0, the binary value of 11 is the second last two bits of the constant value c, the binary value of 10 is the second last two bits of the constant value 8 and the binary value of 01 is the second last two bits of the constant value 4. As such, the second last two bits generated for Nk0 in encryption mode follow the periodic pattern of 00 11 10 01 in every row of the table 1.

In one embodiment, the second last two bits for the Nk2 is generated in encryption mode using same logic 300 except for the +2 (10) add operation 306 as described above with respect to the second last two bits generated for Nk3. As such, the binary values of the second last two bits of Nk2 are same as the directly outputted from the 2b counter 304. Accordingly, a periodic pattern binary values of 11 10, 01 and 00 are generated for Nk2 in the encryption mode. In one embodiment, the binary value of 11 is the second last two bits of the constant value e, the binary value of 10 is the second last two bits of the constant value a, the binary value of 01 is the second last two bits of the constant value 6 and the binary value of 00 is the second last two bits of the constant value 2. As such, the second last two bits generated for NK2 in encryption mode follow a periodic pattern of 11 10 01 00 in every row of the table 1.

In one embodiment, in a decryption mode, the second last two NK3 Nk1 and Nk0 are generated using same logic 300 except the input to the first multiplexer 302 begins with the binary value 00 instead of 11 and +2 (10) add operation is replaced with +1 (01) add operation 314. In one embodiment, the NK3 in decryption mode follows the pattern of 10 11 00 and 01 for the first, second, third and fourth cycles respectively. The binary value of 10 is the second last two bits of the constant value 9, the binary value of 11 is the second last two bits of the constant value d, the binary value of 00 is the second last two bits of the constant value 1 and the binary value of 01 is the second last two bits of the constant value 5. As such, the second last two bits generated for NK3 in the decryption mode follow a periodic pattern of 10 11 00 and 01 in every row of the table 1.

In one embodiment, the second last two bits generated for the NK1 is generated in decryption mode using same logic 300 as described above with respect to the second last two bits for NK3 as described above using a multiplexer 310 instead of a multiplexer 308. In one embodiment, the binary value of 10 is the second last two bits of the constant value b, the binary value of 11 is the second last two bits of the constant value f, the binary value of 00 is the second last two bits of the constant value 3 and the binary value of 01 is the second last two bits of the constant value 7. As such, the second last two bits generated for NK1 in decryption mode follow the same periodic pattern as NK3 of 10 11 00 and 01 in every row of the table 1.

In one embodiment, the second last two bits generated for the NK0 is generated in the decryption mode using same logic 300 as described above with respect to the second last two bits for NK3 as described above using a multiplexer 312 instead of a multiplexer 308. However, the second last two bits generated for Nk0 follow a different periodic pattern from NK3 and NK1. Since, the constant CKs are specified by the SMS4 standard, in this scenario, the NK0 follows a different pattern from NK3 and NK1. In one embodiment, the binary value of 01 is the second last two bits of the constant value 4, the binary value of 10 is the second last two bits of the constant value 8, the binary value of 11 is the second last two bits of the constant value c and the binary value of 00 is the second last two bits of the constant value 0. As such, the second last two bits generated for Nk0 in decryption mode follow the periodic pattern of 01 10 11 and 00 in every row of the table 1.

In one embodiment, the second last two bits for the Nk2 is generated in decryption mode using same logic 300 except for the +1 (01) add operation 312 as described above with respect to the second last two bits generated for Nk3. As such, the binary values of the second last two bits of Nk2 are same as the directly outputted from the 2b counter 304. Accordingly, a periodic pattern of binary values of 00 01 10 and 11 are generated for Nk2 in the decryption mode. In one embodiment, the binary value of 00 is the second last two bits of the constant value 2, the binary value of 01 is the second last two bits of the constant value 6, the binary value of 10 is the second last two bits of the constant value a and the binary value of 11 is the second last two bits of the constant value e. As such, the second last two bits generated for NK2 in the decryption mode follow a periodic pattern of 00 01 10 and 11 in every row of the table 1.

As discussed above, the second last two bits (i.e. next two least significant bits) in round constant bytes exhibit periodic patterns in both encryption and decryption modes of the operation. Accordingly, these second last two bits may be generated using the 2b counter. Hence, the six registers corresponding to these constant bit values in the accumulator are eliminated to save the area on the chip while still generating rounds constants with 100% accuracy.

Figure 4:
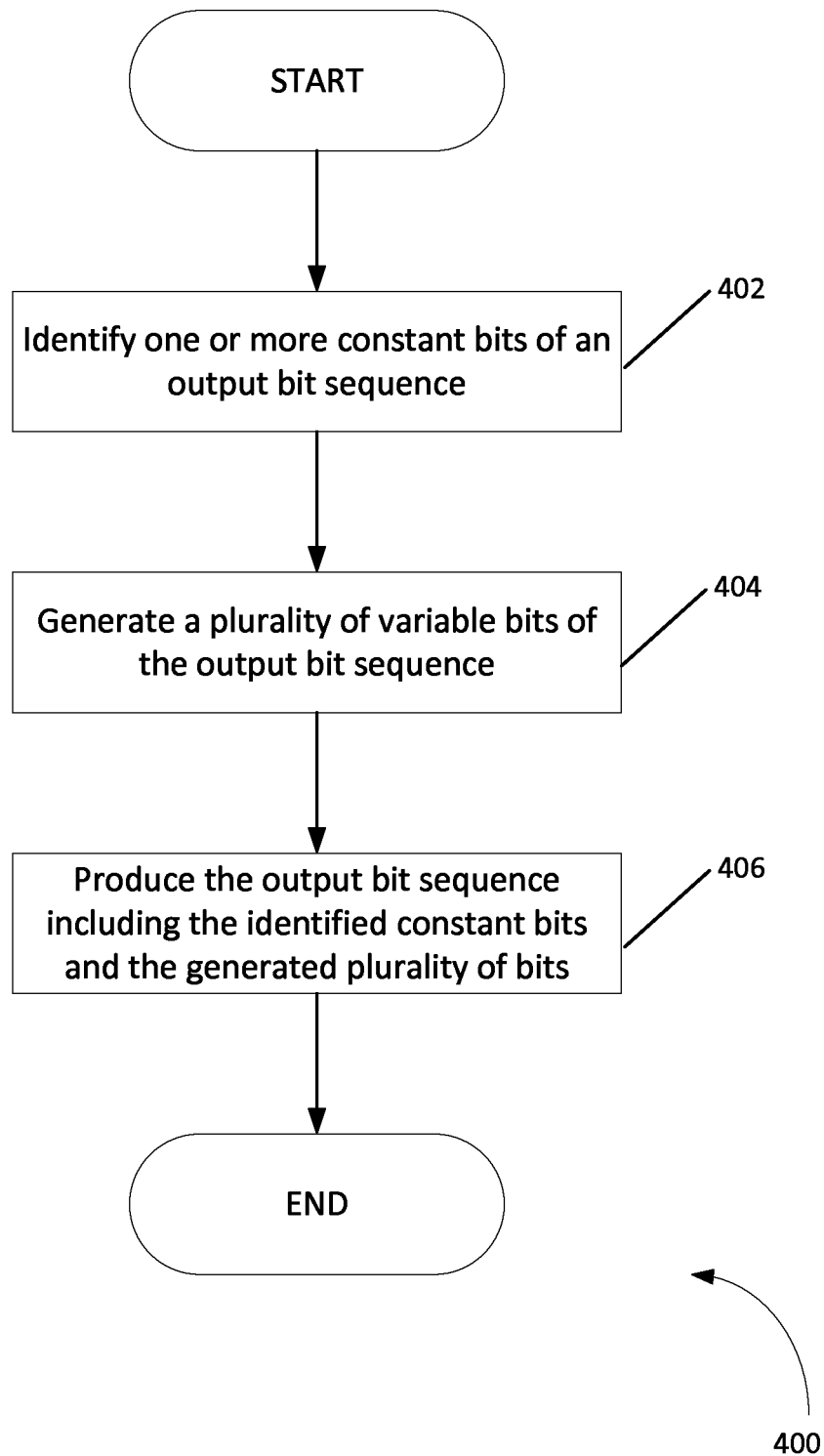
FIG. 4 illustrates a flow diagram of generating the round constant in processors in according to an embodiment of the present disclosure.

FIG. 4 illustrates a flow diagram of a method for generating a round constant in accordance with an embodiment of the present disclosure. Method 400 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one embodiment, method 400 may be performed, in part, by processing logics of any one of processing cores 110 executing an operating system with respect to FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at block 402, the processing logic identifies one or more constant bits of an output bit sequence. At block 404, the processing logic generates a plurality of variable bits of the output bit sequence. In one embodiment, the plurality of variable bits include a periodic repetition of a set of the plurality of bits. In one embodiment, the plurality of variable bits are generated in an encryption mode by incrementing an accumulator by an integer value. In one example, the integer value in the encryption mode is 2. In one embodiment, plurality of variable bits are generated in a decryption mode by the accumulator by an integer value. In one example, the integer value in the decryption mode is 1. At block 406, the processing logic produces the output bit sequence including the identified constant bits and the generated plurality of variable bits.

Figure 5:
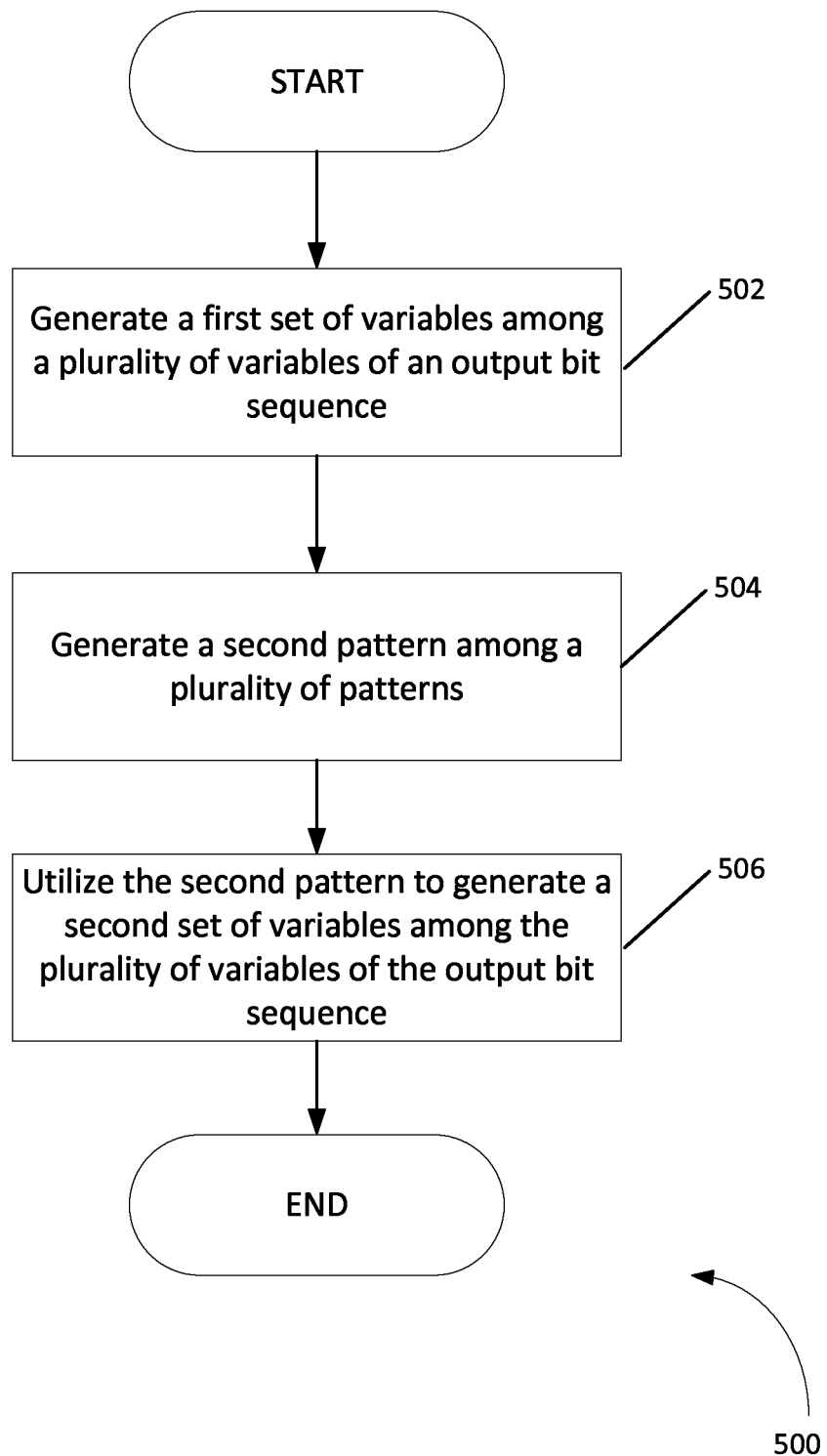
FIG. 5 illustrates a flow diagram of generating the round constant in processors in according to an embodiment of the present disclosure.

FIG. 5 illustrates a flow diagram of a method for generating a round constant in accordance with an embodiment of the present disclosure. Method 500 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one embodiment, method 500 may be performed, in part, by processing logics of any one of processing cores 110 executing an operating system with respect to FIG. 1.

For simplicity of explanation, the method 500 is depicted and described as a series of acts. However, acts in accordance with this disclosure can occur in various orders and/or concurrently and with other acts not presented and described herein. Furthermore, not all illustrated acts may be performed to implement the method 500 in accordance with the disclosed subject matter. In addition, those skilled in the art will understand and appreciate that the method 500 could alternatively be represented as a series of interrelated states via a state diagram or events.

Referring to FIG. 5, at block 502, the processing logic generates a first set of variables among a plurality of variable bits of an output bit sequence. In one embodiment, the first set of variables are generated by initializing a counter to a first pattern among a plurality of patterns. At block 504, the processing logic generates a second pattern among a plurality of the patterns. In one embodiment, the second pattern is generated by coupling an adder circuit to the counter. The second set of variable bits is different from the first set of the variable bits. At block 506, the processing logic includes utilizing the second pattern to generate a second set of variable bits among a plurality of variable bits of the output bit sequence. In one embodiment, the output bit sequence includes constant bits and the plurality of variable bits. In one embodiment, the output bit sequence includes constant bits and the generated plurality of variable bits.

Figure 6A:
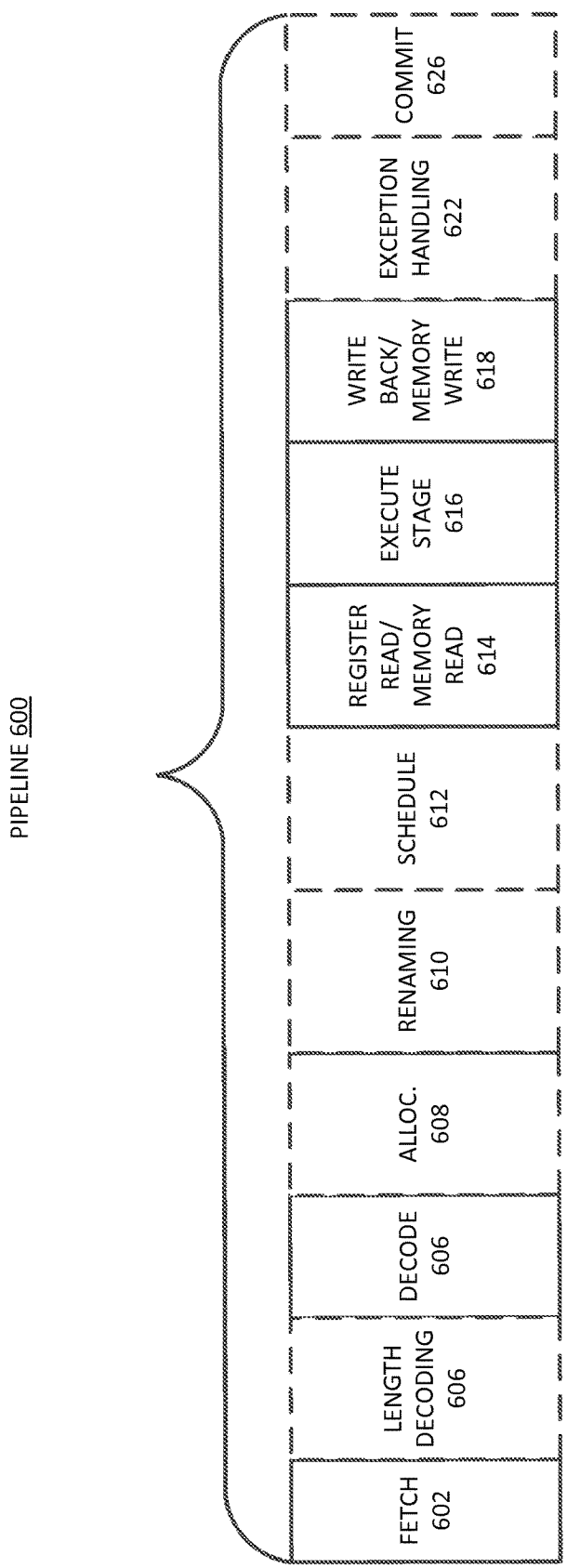
FIG. 6A is a block diagram illustrating a micro-architecture for a processor in which one embodiment of the disclosure may be used.
Figure 6B:
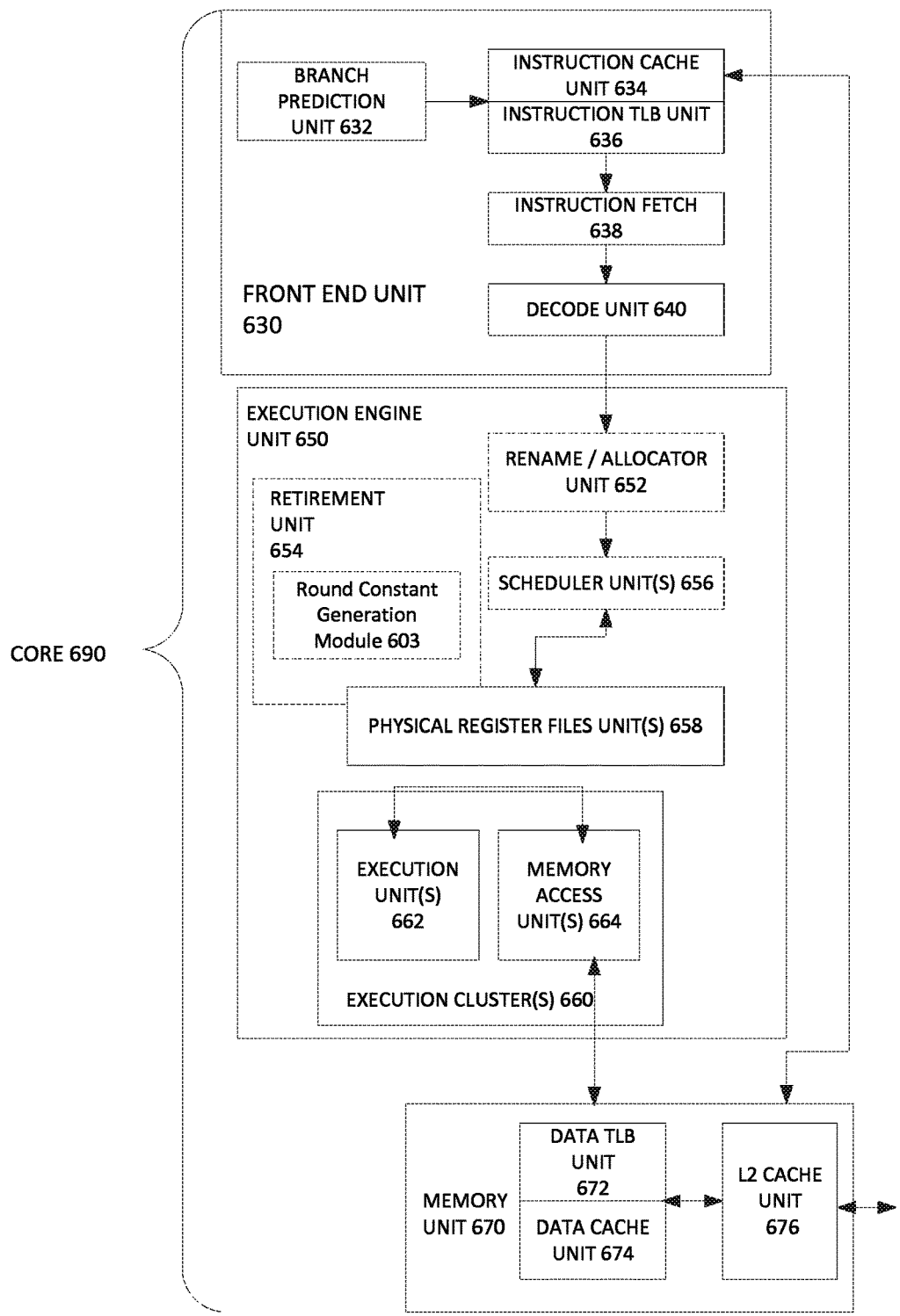
FIG. 6B is a block diagram illustrating an in-order pipeline and a register renaming stage, out-of-order issue/execution pipeline implemented according to at least one embodiment of the disclosure.

FIG. 6A is a block diagram illustrating an in-order pipeline and a register re-naming stage, out-of-order issue/execution pipeline of a processor monitoring performance of a processing device to manage non-precise events according to at least one embodiment of the invention. FIG. 6B is a block diagram illustrating an in-order architecture core and a register renaming logic, out-of-order issue/execution logic to be included in a processor according to at least one embodiment of the invention. The solid lined boxes in FIG. 6A illustrate the in-order pipeline, while the dashed lined boxes illustrates the register renaming, out-of-order issue/execution pipeline. Similarly, the solid lined boxes in FIG. 6B illustrate the in-order architecture logic, while the dashed lined boxes illustrates the register renaming logic and out-of-order issue/execution logic.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the stages are provided in a different order and different stages may be considered in-order and out-of-order.

In FIG. 6B, arrows denote a coupling between two or more units and the direction of the arrow indicates a direction of data flow between those units. FIG. 6B shows processor core 690 including a front end unit 630 coupled to an execution engine unit 650, and both are coupled to a memory unit 70.

The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to a level 2 (L2) cache unit 676 in the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The retirement unit 654 may include a round constant generation module 603 for providing area optimal configuration in processors while allowing for on-the-fly key expansion for key generation according to embodiments of the invention. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 38 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
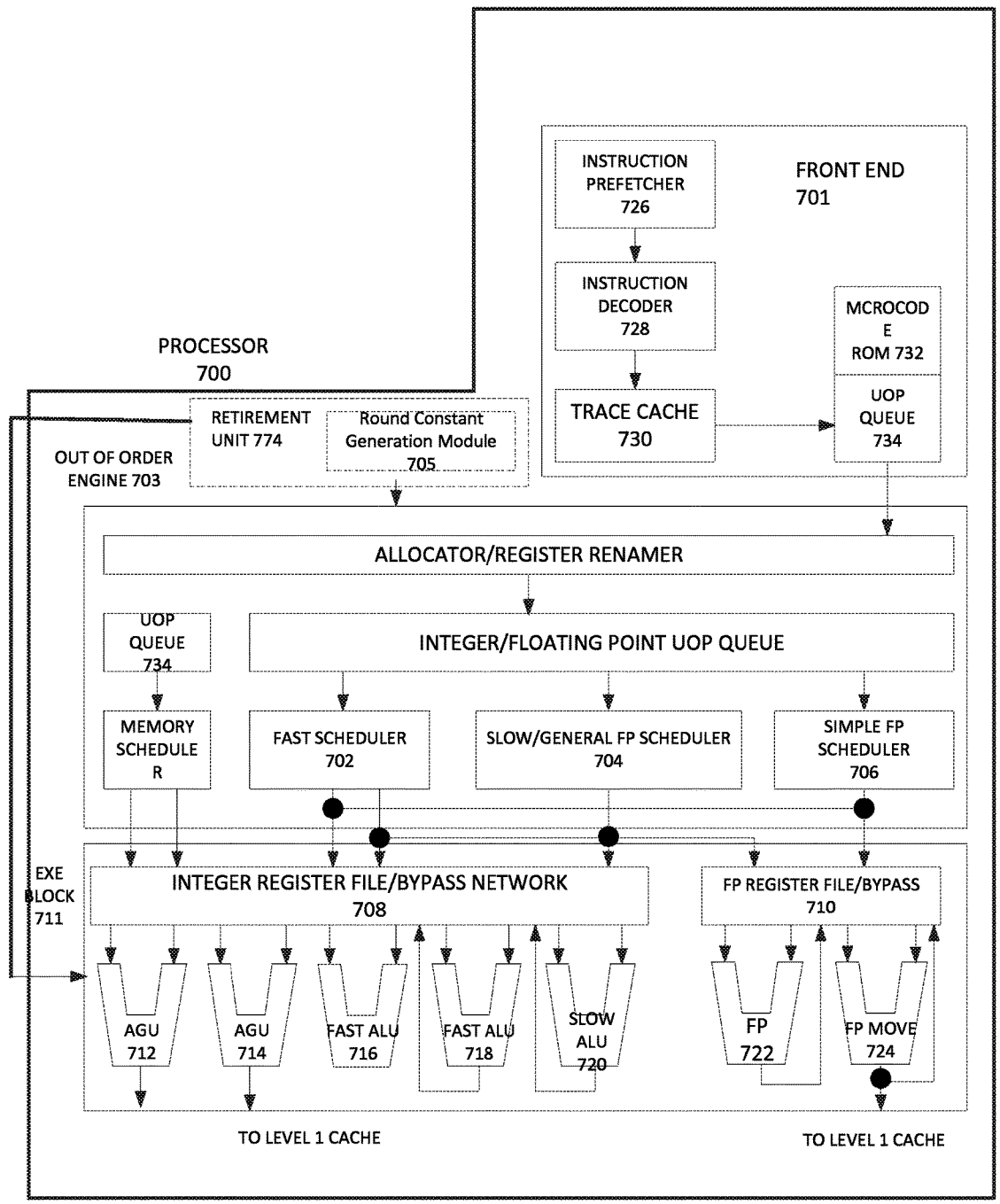
FIG. 7 illustrates a block diagram of the micro-architecture for a processor in accordance with one embodiment of the disclosure.

FIG. 7 is a block diagram illustrating a micro-architecture for a processor 700 that includes logic circuits to perform instructions in accordance with one embodiment of the invention. In one embodiment, processor 700 monitors performance of a processing device to manage non-precise events. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The front end 701 may include several units. In one embodiment, the instruction prefetcher 726 fetches instructions from memory and feeds them to an instruction decoder 728, which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others use several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706 determine when a uop is ready to execute based on the readiness of their dependent input register operand sources and the availability of the execution resources the uops use to complete their operation. The fast scheduler 702 of one embodiment can schedule on each half of the main clock cycle while the other schedulers can schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 66 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions use to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 54 bit floating point divider to execute divide, square root, and remainder micro-ops. For embodiments of the invention, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720 are described in the context of performing integer operations on 64 bit data operands. In alternative embodiments, the ALUs 716, 718, 720 can be implemented to support a variety of data bits including 16, 32, 128, 256, etc. Similarly, the floating point units 722, 724 can be implemented to support a range of operands having bits of various widths. For one embodiment, the floating point units 722, 724 can operate on 128 bits wide packed data operands in conjunction with SIMD and multimedia instructions.

In one embodiment, the uops schedulers 702, 704, 706 dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The processor 700 may include a retirement unit 754 coupled to the execution block 711. The retirement unit 754 may include a round constant generation module 705 for providing area optimal configuration in processors while allowing for on-the-fly key expansion for key generation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are contained in either the same register file or different register files. Furthermore, in one embodiment, floating point and integer data may be stored in different registers or the same registers.

Figure 8:
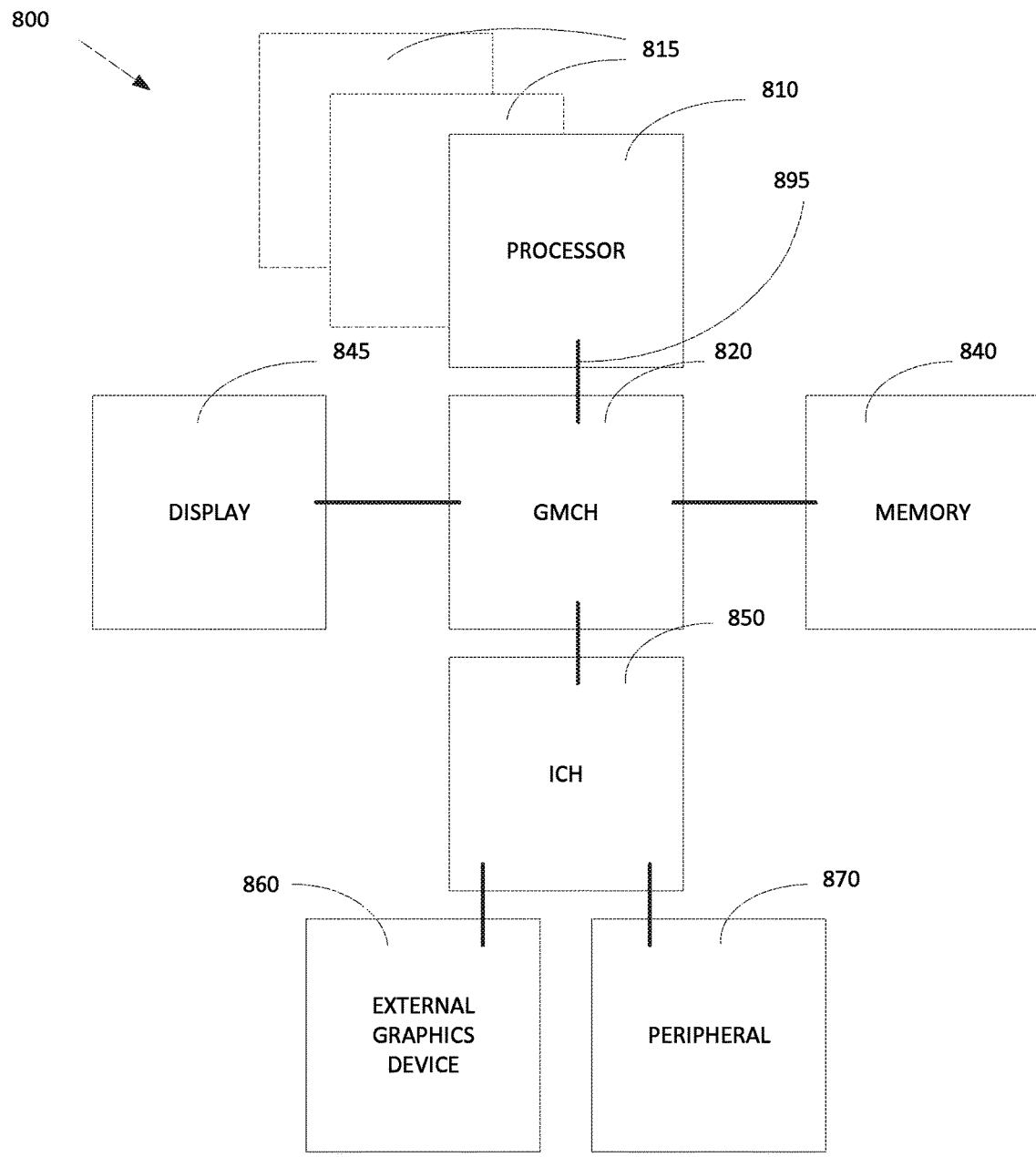
FIG. 8 is a block diagram illustrating a system in which an embodiment of the disclosure may be used.

Referring now to FIG. 8, shown is a block diagram of a system 800 in accordance with one embodiment of the invention. The system 800 may include one or more processors 810, 815, which are coupled to graphics memory controller hub (GMCH) 820. The optional nature of additional processors 815 is denoted in FIG. 8 with broken lines. In one embodiment, a processor 810, 815 monitors performance of a processing device to manage non-precise events.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
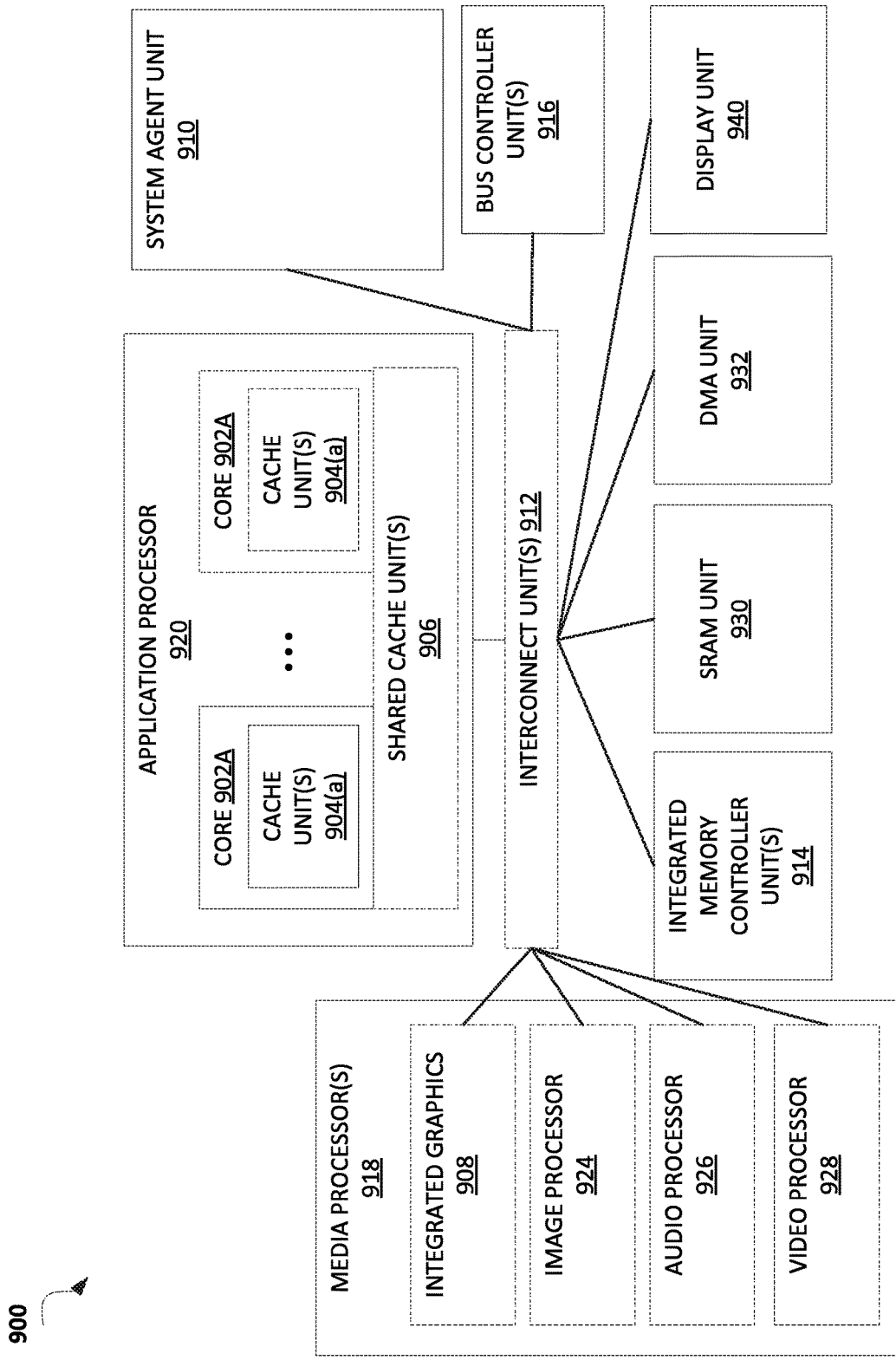
FIG. 9 is a block diagram of a system in which an embodiment of the disclosure may operate.

Embodiments may be implemented in many different system types. FIG. 9 is a block diagram of a SoC 900 in accordance with an embodiment of the present disclosure. Dashed lined boxes are optional features on more advanced SoCs. In FIG. 9, an interconnect unit(s) 912 is coupled to: an application processor 920 which includes a set of one or more cores 902A-N and shared cache unit(s) 906; a system agent unit 910; a bus controller unit(s) 916; an integrated memory controller unit(s) 914; a set or one or more media processors 918 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays. In one embodiment, a memory module may be included in the integrated memory controller unit(s) 914. In another embodiment, the memory module may be included in one or more other components of the SoC 900 that may be used to access and/or control a memory. The application processor 920 may include a conditional branch, indirect branch and event execution logics as described in embodiments herein.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof.

In some embodiments, one or more of the cores 902A-N are capable of multi-threading.

The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture and/or instruction set. For example, some of the cores 902A-N may be in order while others are out-of-order. As another example, two or more of the cores 902A-N may be capable of execution the same instruction set, while others may be capable of executing only a subset of that instruction set or a different instruction set.

The application processor 920 may be a general-purpose processor, such as a Core™ i3, i5, i7, 2 Duo and Quad, Xeon™, Itanium™, Atom™, XScale™ or StrongARM™ processor, which are available from Intel™ Corporation, of Santa Clara, Calif. Alternatively, the application processor 920 may be from another company, such as ARM Holdings™, Ltd, MIPS™, etc. The application processor 920 may be a special-purpose processor, such as, for example, a network or communication processor, compression engine, graphics processor, co-processor, embedded processor, or the like. The application processor 920 may be implemented on one or more chips. The application processor 920 may be a part of and/or may be implemented on one or more substrates using any of a number of process technologies, such as, for example, BiCMOS, CMOS, or NMOS.

Figure 10:
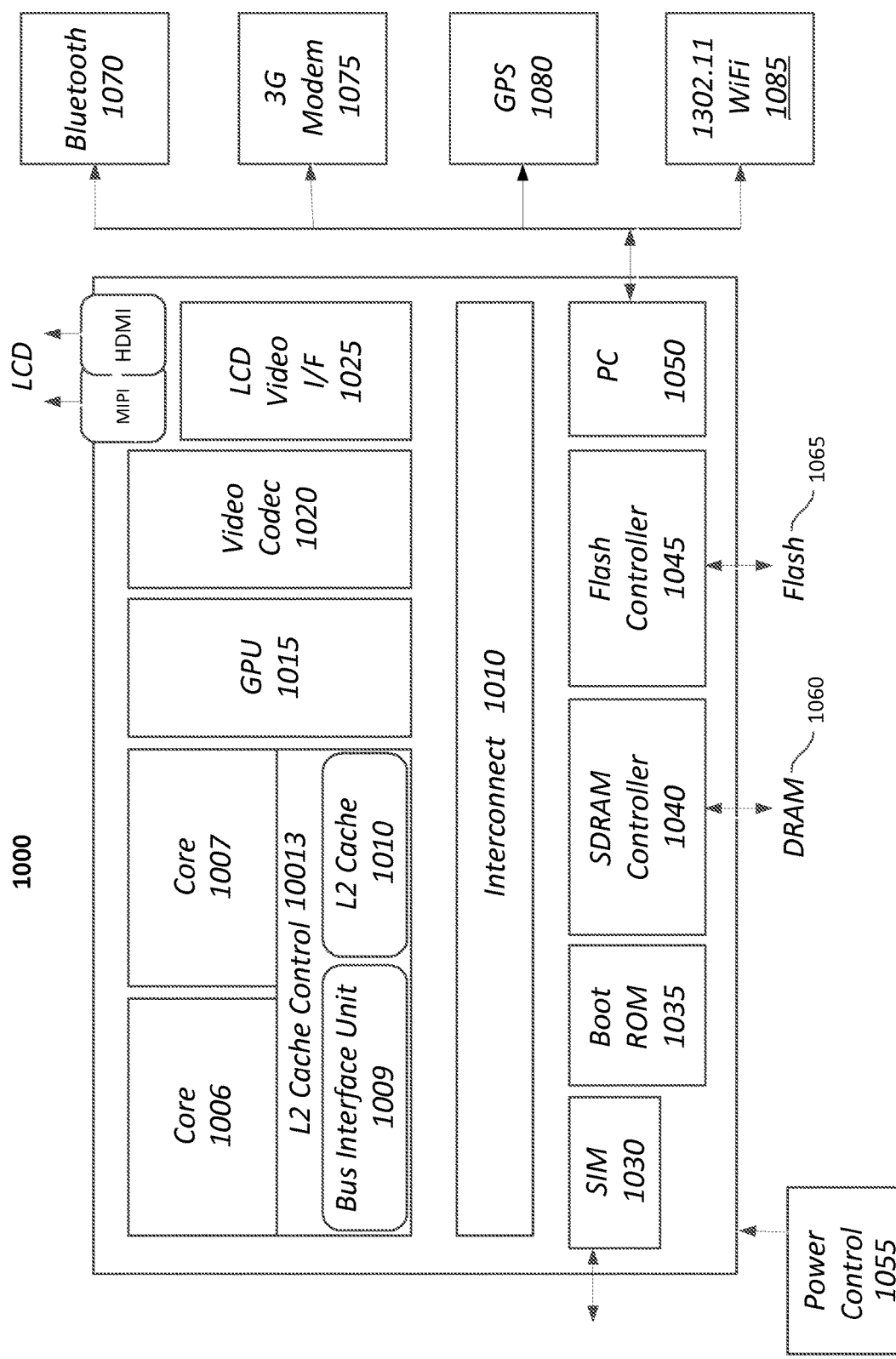
FIG. 10 is a block diagram of a system in which an embodiment of the disclosure may operate.

FIG. 10 is a block diagram of an embodiment of a system on-chip (SoC) design in accordance with the present disclosure. As a specific illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1008 and L2 cache 1010 to communicate with other parts of system 1000. Interconnect 1010 includes an on-chip interconnect, such as an IOSF, AMBA, or other interconnect discussed above, which potentially implements one or more aspects of the described disclosure. In one embodiment, a conditional branch, indirect branch and event execution logics may be included in cores 1006, 1007.

Interconnect 1010 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g.

Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein. In addition, the system 1000 illustrates peripherals for communication, such as a Bluetooth module 1070, 3G modem 1075, GPS 1080, and Wi-Fi 1085.

Figure 11:
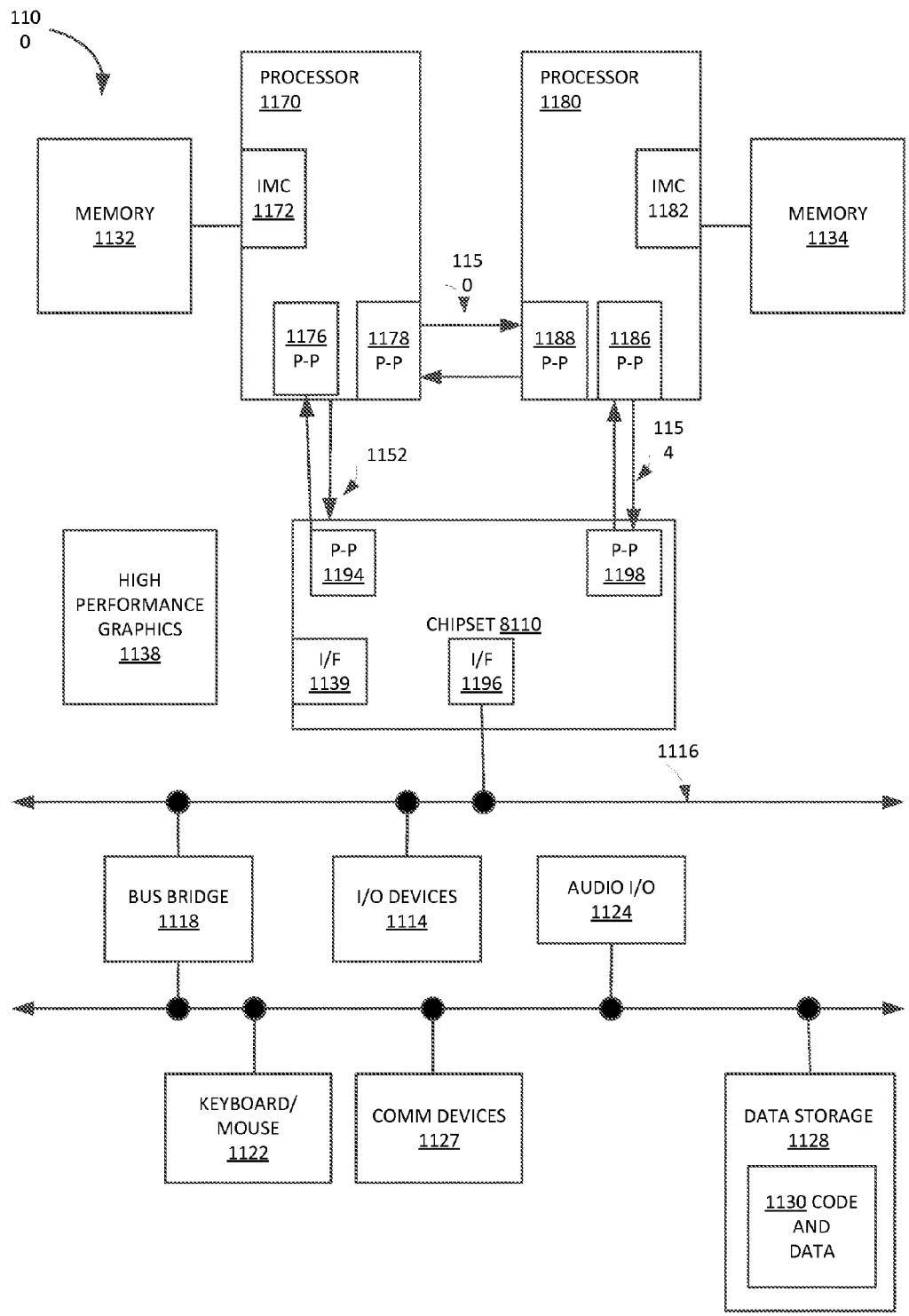
FIG. 11 is a block diagram of a System-on-a-Chip (SoC) in accordance with an embodiment of the present disclosure.

Referring now to FIG. 11, shown is a block diagram of a system 1100 in accordance with an embodiment of the invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processors of the computing systems as described herein. In one embodiment, processors 1170, 1180 monitoring performance of a processing device to manage non-precise events to monitor performance of a processing device to manage non-precise events.

While shown with two processors 1170, 1180, it is to be understood that the scope of the disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170 and 1180 may each exchange information with a chipset 1190 via individual P-P interfaces 1152, 1154 using point to point interface circuits 1176, 1194, 1186, 1198. Chipset 1190 may also exchange information with a high-performance graphics circuit 1138 via a high-performance graphics interface 1139.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1116. In one embodiment, first bus 1116 may be a Peripheral Component Interconnect (PCI) bus, or a bus such as a PCI Express bus or another third generation I/O interconnect bus, although the scope of the disclosure is not so limited.

As shown in FIG. 11, various I/O devices 1114 may be coupled to first bus 1116, along with a bus bridge 1118, which couples first bus 1116 to a second bus 1120. In one embodiment, second bus 1120 may be a low pin count (LPC) bus. Various devices may be coupled to second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to second bus 1120. Note that other architectures are possible. For example, instead of the point-to-point architecture of FIG. 11, a system may implement a multi-drop bus or other such architecture.

Figure 12:
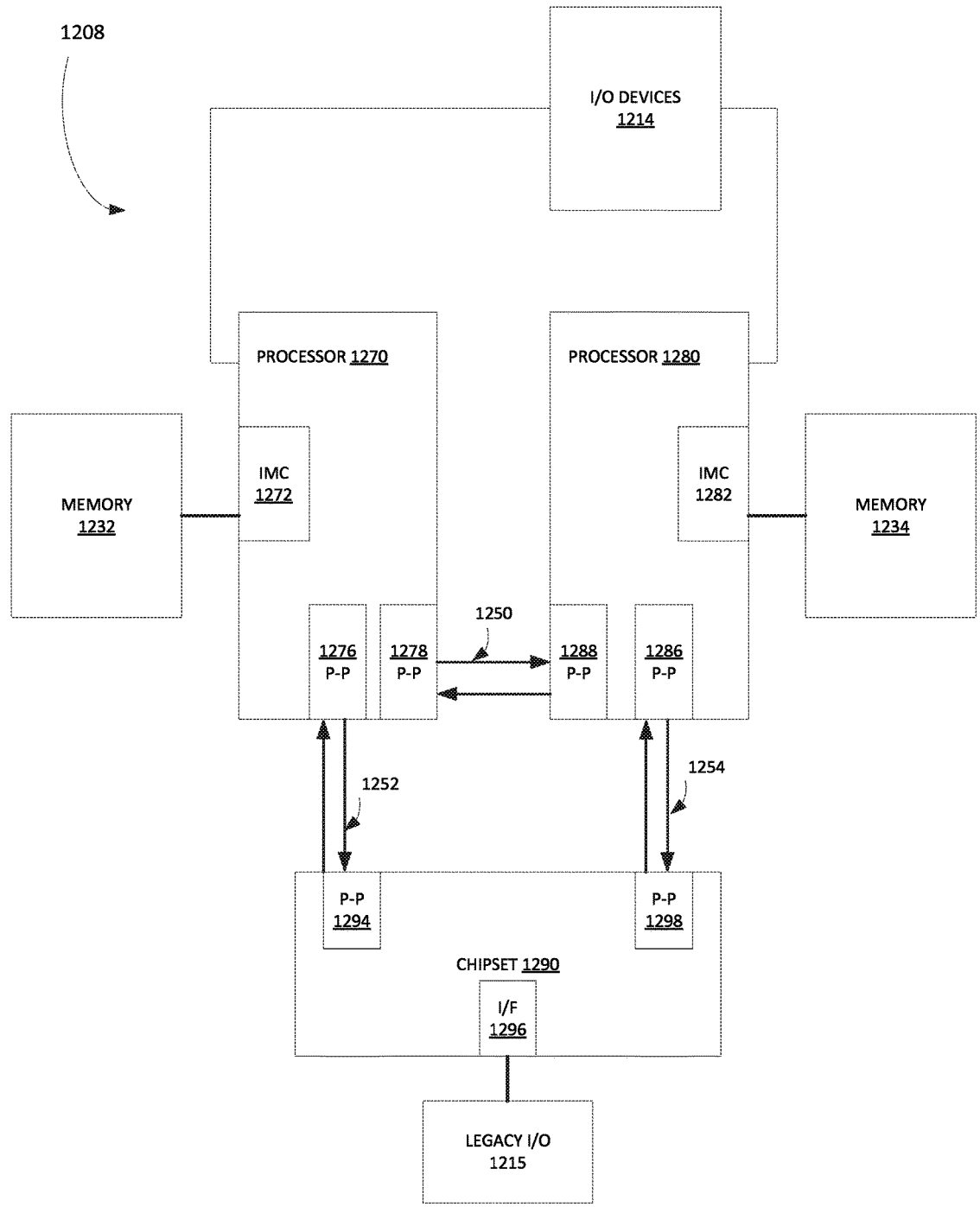
FIG. 12 is a block diagram of an embodiment of an SoC design in accordance with the present disclosure.

Referring now to FIG. 12, shown is a block diagram of a system 1200 in accordance with an embodiment of the invention. FIG. 12 illustrates processors 1270, 1280. In one embodiment, processors 1270, 1280 monitor performance of a processing device to manage non-precise events. Furthermore, processors 1270, 1280 may include integrated memory and I/O control logic ("CL") 1272 and 1282, respectively and intercommunicate with each other via point-to-point interconnect 1250 between point-to-point (P-P) interfaces 1278 and 1288 respectively. Processors 1270, 1280 each communicate with chipset 1290 via point-to-point interconnect 1252 and 1254 through the respective P-P interfaces 1276 to 1294 and 1286 to 1298 as shown. For at least one embodiment, the CL 1272, 1282 may include integrated memory controller units. CLs 1272, 1282 may include I/O control logic. As depicted, memories 1232, 1234 coupled to CLs 1272, 1282 and I/O devices 1214 are also coupled to the control logic 1272, 1282. Legacy I/O devices 1215 are coupled to the chipset 1290 via interface 1296.

Figure 13:
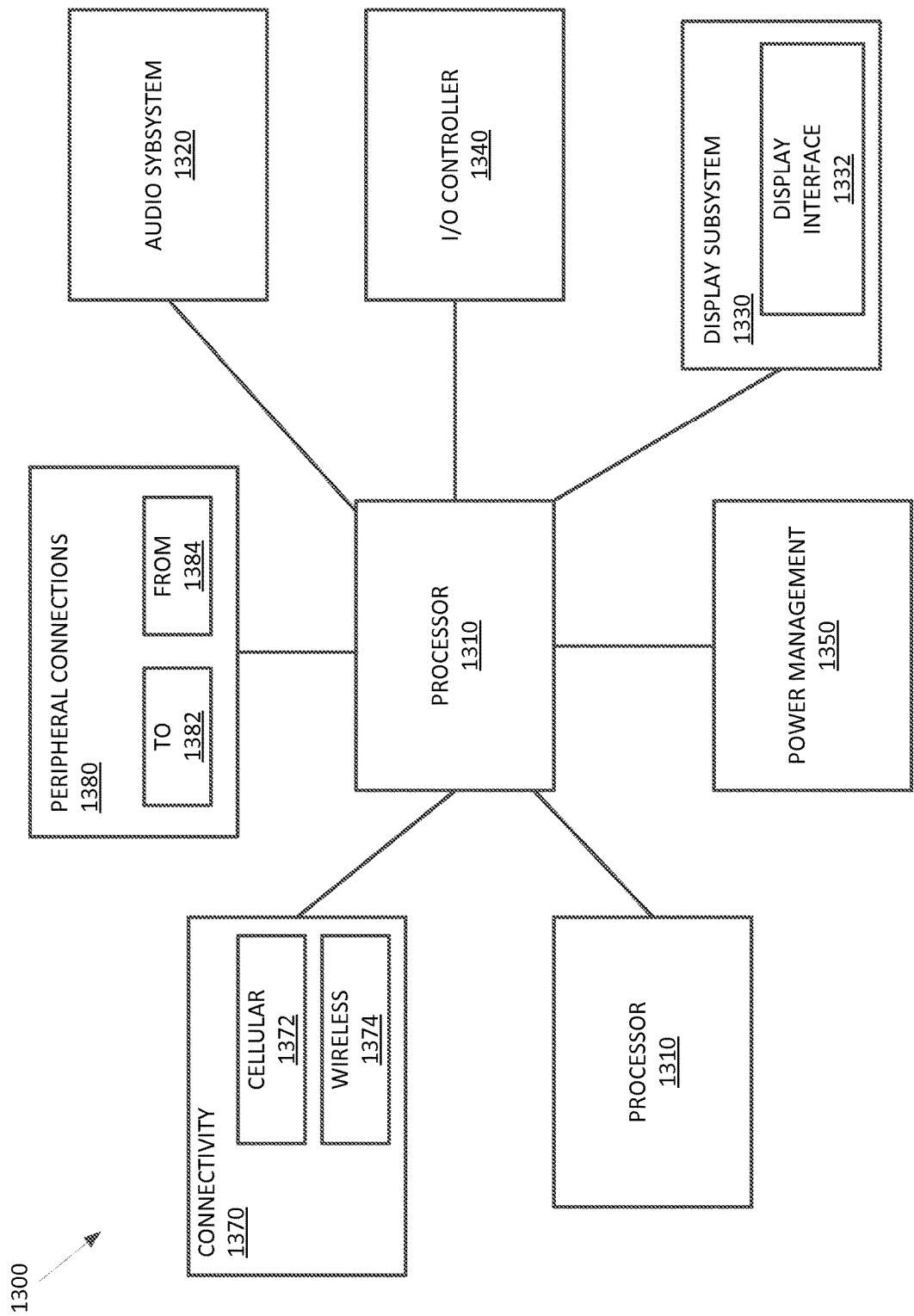
FIG. 13 illustrates a block diagram of one embodiment of a computer system.

FIG. 13 illustrates a block diagram 1300 of an embodiment of tablet computing device, a smartphone, or other mobile device in which touchscreen interface connectors may be used. Processor 1310 may monitor performance of a processing device to manage non-precise events. In addition, processor 1310 performs the primary processing operations. Audio subsystem 1320 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1310.

Display subsystem 1332 represents hardware (e.g., display devices) and software (e.g., drivers) components that provide a visual and/or tactile display for a user to interact with the tablet computing device or smartphone. Display subsystem 1330 includes display interface 1332, which includes the particular screen or hardware device used to provide a display to a user. In one embodiment, display subsystem 1330 includes a touchscreen device that provides both output and input to a user.

I/O controller 1340 represents hardware devices and software components related to interaction with a user. I/O controller 1340 can operate to manage hardware that is part of audio subsystem 1320 and/or display subsystem 1330. Additionally, I/O controller 1340 illustrates a connection point for additional devices that connect to the tablet computing device or smartphone through which a user might interact. In one embodiment, I/O controller 1340 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1350 that manages battery power usage, charging of the battery, and features related to power saving operation. Memory subsystem 1360 includes memory devices for storing information in the tablet computing device or smartphone. Connectivity 1370 includes hardware devices (e.g., wireless and/or wired connectors and communication hardware) and software components (e.g., drivers, protocol stacks) to the tablet computing device or smartphone to communicate with external devices. Cellular connectivity 1372 may include, for example, wireless carriers such as GSM (global system for mobile communications), CDMA (code division multiple access), TDM (time division multiplexing), or other cellular service standards). Wireless connectivity 1374 may include, for example, activity that is not cellular, such as personal area networks (e.g., Bluetooth), local area networks (e.g., WiFi), and/or wide area networks (e.g., WiMax), or other wireless communication.

Peripheral connections 1380 include hardware interfaces and connectors, as well as software components (e.g., drivers, protocol stacks) to make peripheral connections as a peripheral device ("to" 1382) to other computing devices, as well as have peripheral devices ("from" 1384) connected to the tablet computing device or smartphone, including, for example, a "docking" connector to connect with other computing devices. Peripheral connections 1380 include common or standards-based connectors, such as a Universal Serial Bus (USB) connector, DisplayPort including MiniDisplayPort (MDP), High Definition Multimedia Interface (HDMI), Firewire, etc.

Figure 14:
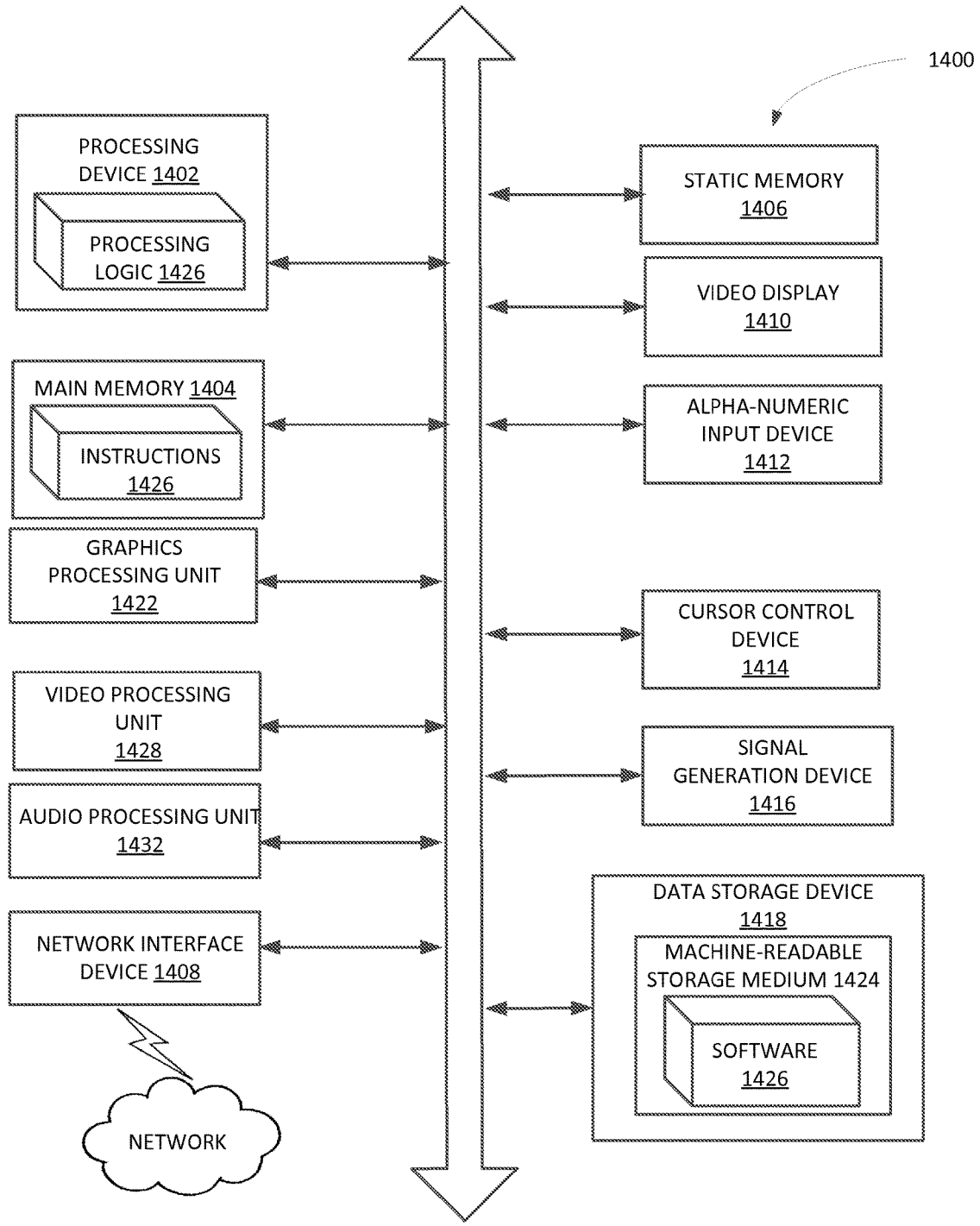
FIG. 14 illustrates a block diagram of a machine in form of a computing system in accordance with the present disclosure.

FIG. 14 illustrates a diagrammatic representation of a machine in the example form of a computing system 1400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1400 includes a processing device 1402, a main memory 1404 (e.g., read-only memory (ROM), flash memory, dynamic random access memory (DRAM) (such as synchronous DRAM (SDRAM) or DRAM (RDRAM), etc.), a static memory 1406 (e.g., flash memory, static random access memory (SRAM), etc.), and a data storage device 1418, which communicate with each other via a bus 1430.

Processing device 1402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. In one embodiment, processing device 1402 may include one or processing cores. The processing device 1402 is configured to execute the processing logic 1426 for performing the operations discussed herein. In one embodiment, processing device 1402 is the same as computer systems 100 and 200 as described with respect to FIG. 1 that implements the NPEBS module 106. Alternatively, the computing system 1400 can include other components as described herein.

The computing system 1400 may further include a network interface device 1408 communicably coupled to a network 1420. The computing system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), a signal generation device 1416 (e.g., a speaker), or other peripheral devices. Furthermore, computing system 1400 may include a graphics processing unit 1422, a video processing unit 1428 and an audio processing unit 1432. In another embodiment, the computing system 1400 may include a chipset (not illustrated), which refers to a group of integrated circuits, or chips, that are designed to work with the processing device 1402 and controls communications between the processing device 1402 and external devices. For example, the chipset may be a set of chips on a motherboard that links the processing device 1402 to very high-speed devices, such as main memory 1404 and graphic controllers, as well as linking the processing device 1402 to lower-speed peripheral buses of peripherals, such as USB, PCI or ISA buses.

The data storage device 1418 may include a computer-readable storage medium 1424 on which is stored software 1426 embodying any one or more of the methodologies of functions described herein. The software 1426 may also reside, completely or at least partially, within the main memory 1404 as instructions 1426 and/or within the processing device 1402 as processing logic 1426 during execution thereof by the computing system 1400; the main memory 1404 and the processing device 1402 also constituting computer-readable storage media.

The computer-readable storage medium 1424 may also be used to store instructions 1426 utilizing the NPEBS module 106 described with respect to FIG. 1 and/or a software library containing methods that call the above applications. While the computer-readable storage medium 1424 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments.

Example 1 is a processing system comprising a memory and a processing logic operatively coupled to the memory, the processing logic to identify one or more constant bits of an output bit sequence, to generate a plurality of variable bits of the output bit sequence and to produce the output bit sequence comprising the identified constant bits and the generated plurality of variable bits.

In Example 2, the subject matter of Example 1 can optionally include wherein generating the plurality of variable bits in an encryption mode comprises incrementing an accumulator by an integer value.

In Example 3, the subject matter of Examples 1-2 can optionally include wherein generating the plurality of variable bits in a decryption mode comprises decrementing an accumulator by an integer value.

In Example 4, the subject matter of Examples 1-3 can optionally include wherein the plurality of variable bits comprise a periodic repetition of a set of the plurality of variable bits.

In Example 5, the subject matter of Examples 1-4 can optionally include wherein the output bit sequence is stored in a register.

Example 6 is a processing system comprising a memory and a processing logic operatively coupled to the memory, the processing logic comprising a counter initialized to a first pattern among a plurality of patterns to generate a first set of variable bits among a plurality of variable bits of an output bit sequence; and an adder circuit coupled to the counter to generate a second pattern among the plurality of patterns, wherein output of adder circuit utilizes the second pattern to generate a second set of variable bits among a plurality of variable bits of the output bit sequence, wherein the second set of variable bits is different than the first set of variable bits.

In Example 7, the subject matter of Example 6 can optionally include wherein the counter is decremented by an integer in each cycle in an encryption mode of operation, wherein the counter is incremented by an integer in each cycle in an decryption mode of operation.

In Example 8, the subject matter of Examples 6-7 can optionally include wherein the first pattern is a periodic repetition of the first set of the variable bits and the second pattern is periodic repetition of the second set of the variable bits.

In Example 9, the subject matter of Examples 6-8 can optionally include wherein the output bit sequence comprises constant bits and the generated plurality of variable bits.

In Example 10, the subject matter of Examples 6-9 can optionally include wherein the output bit sequence comprises constant bits and the generated plurality of bits.

Example 11 is a method comprising identifying one or more constant bits of an output bit sequence; generating a plurality of variable bits of the output bit sequence; and producing the output bit sequence comprising the identified constant bits and the generated plurality of variable bits.

In Example 12, the subject matter of Example 11 can optionally include generating the plurality of variable bits in an encryption mode comprises incrementing an accumulator by an integer value.

In Example 13, the subject matter of Examples 11-12 can optionally include generating the plurality of variable bits in a decryption mode comprises decrementing an accumulator by an integer value.

In Example 14, the subject matter of Examples 11-13 can optionally include storing the output bit sequence in a register.

In Example 15, the subject matter of Examples 11-14 can optionally include wherein the plurality of variable bits comprise a periodic repetition of a set of the plurality of variable bits.

Example 16 is a method comprising generating a first set of variable bits among a plurality of variable bits of an output bit sequence, wherein the generating comprising initializing a counter to a first pattern among a plurality of patterns; generating a second pattern among a plurality of the patterns, wherein the generating comprising coupling an adder circuit to the counter; and utilizing the second pattern to generate a second set of variable bits among a plurality of variable bits of the output bit sequence, wherein the second set of variable bits is different than the first set of variable bits.

In Example 17, the subject matter of Example 16 can optionally include storing the output bit sequence in a register.

In Example 18, the subject matter of Example 16-17 can optionally include wherein the counter is decremented by an integer in each cycle in an encryption mode of operation, wherein the counter is incremented by an integer in each cycle in an decryption mode of operation.

In Example 19, the subject matter of Example 16-18 can optionally include wherein the first pattern is a periodic repetition of the first set of the variable bits and the second pattern is periodic repetition of the second set of the variable bits.

In Example 20, the subject matter of Example 16-19 can optionally include wherein the output bit sequence comprises constant bits and the generated plurality of variable bits.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. A processing system comprising:
a memory;
a processor coupled to the memory; and
processing logic operatively coupled to the memory for execution by the processor to generate a plurality of round constants for encryption/decryption key expansion, the processing logic to:
   identify one or more constant bits common to all of the round constants;
   generate a first plurality of variable bits of a first output bit sequence comprising a first one of the round constants;
   produce the first output bit sequence by combining the identified constant bits and the generated first plurality of variable bits;
   provide the first output bit sequence comprising the identified constant bits and the generated plurality of variable bits to a key expansion module, the key expansion module using the provided output bit sequence to generate an encryption/decryption key;
   generate a second plurality of variable bits of a second output sequence comprising a second one of the round constants; and
   produce the second output bit sequence from the first output bit sequence by combining the identified constant bits and the generated second plurality of variable bits;
wherein the processor comprises an SMS4 hardware accelerator that generates the plurality of round constants to eliminate a need for a lookup table.

2. The processing system of claim 1 wherein generating the first plurality of variable bits in an encryption mode comprises incrementing an accumulator by an integer value.

3. The processing system of claim 1 wherein generating the first plurality of variable bits in a decryption mode comprises decrementing an accumulator by an integer value.

4. The processing system of claim 1 wherein the first plurality of variable bits comprises a periodic repetition of a set of the plurality of variable bits.

5. The processing system of claim 1 wherein the first output bit sequence is stored in a register.

6. A processing system comprising:
   a memory;
   a processor coupled to the memory; and
   processing logic operatively coupled to the memory and the processor for generating a round constant for encryption/decryption key expansion, the processing logic comprising:
      a counter initialized to a first pattern among a plurality of patterns to generate a first set of variable bits among a plurality of variable bits of an output bit sequence; and
      an adder circuit coupled to the counter to generate a second pattern among the plurality of patterns, wherein output of adder circuit utilizes the second pattern to generate a second set of variable bits among a plurality of variable bits of the output bit sequence, wherein the second set of variable bits is different than the first set of variable bits;
   wherein the output bit sequence is provided to a key expansion module, the key expansion module using the provided output bit sequence to generate an encryption/decryption key; and
   wherein the output bit sequence comprises a plurality of constant bits and the generated plurality of variable bits;
wherein the processor comprises an SMS4 hardware accelerator that generates the plurality of round constants to eliminate a need for a lookup table.

7. The processing system of claim 6 wherein the counter is decremented by an integer in each cycle in an encryption mode of operation, wherein the counter is incremented by an integer in each cycle in a decryption mode of operation.

8. The processing system of claim 6 wherein the first pattern is a periodic repetition of the first set of the variable bits and the second pattern is periodic repetition of the second set of the variable bits.

9. The processing system of claim 6 wherein the output bit sequence is stored in a register.

10. A method for generating a round constant for use in encryption/decryption key expansion, the method comprising:
    identifying one or more constant bits common to all of the round constants;
    generating a first plurality of variable bits of a first output bit sequence comprising a first one of the round constants;
    producing the first output bit sequence by combining the identified constant bits and the generated first plurality of variable bits;
    providing the first output bit sequence comprising the identified constant bits and the generated plurality of variable bits to a key expansion module, the key expansion module using the provided output bit sequence to generate an encryption/decryption key;
    generating a second plurality of variable bits of a second output sequence comprising a second one of the round constants; and
       producing the second output bit sequence from the first output bit sequence by combining the identified constant bits and the generated second plurality of variable bits;
    wherein the processor comprises an SMS4 hardware accelerator that generates the plurality of round constants to eliminate a need for a lookup table.

11. The method of claim 10 further comprising generating the first plurality of variable bits in an encryption mode comprises incrementing an accumulator by an integer value.

12. The method of claim 10 further comprising generating the first plurality of variable bits in a decryption mode comprises decrementing an accumulator by an integer value.

13. The method of claim 10 further comprising storing the output bit sequence in a register.

14. The method of claim 10 wherein the plurality of variable bits comprises a periodic repetition of a set of the plurality of variable bits.

15. A method for generating a round constant for use in encryption/decryption key expansion, the method comprising:
    generating a first set of variable bits among a plurality of variable bits of an output bit sequence, wherein the generating comprising initializing a counter to a first pattern among a plurality of patterns;
    generating a second pattern among a plurality of the patterns, wherein the generating comprising coupling an adder circuit to the counter; and
    utilizing the second pattern to generate a second set of variable bits among a plurality of variable bits of the output bit sequence, wherein the second set of variable bits is different than the first set of variable bits;
    wherein the output bit sequence is provided to a key expansion module, the key expansion module using the provided output bit sequence to generate an encryption/decryption key; and
       wherein the output bit sequence comprises a plurality of constant bits and the generated plurality of variable bits;

wherein the processor comprises an SMS4 hardware accelerator that generates the plurality of round constants to eliminate a need for a lookup table.

16. The method of claim 15 further comprising storing the output bit sequence in a register.

17. The method of claim 15 wherein the counter is decremented by an integer in each cycle in an encryption mode of operation, wherein the counter is incremented by an integer in each cycle in a decryption mode of operation.

18. The method of claim 15 wherein the first pattern is a periodic repetition of the first set of the variable bits and the second pattern is periodic repetition of the second set of the variable bits.

* * * * *